US008031062B2

(12) United States Patent
Smith

(10) Patent No.: US 8,031,062 B2
(45) Date of Patent: Oct. 4, 2011

(54) METHOD AND APPARATUS TO IMPROVE VEHICLE SITUATIONAL AWARENESS AT INTERSECTIONS

(76) Inventor: Alexander E. Smith, McLean, VA (US)

( * ) Notice: Subject to any disclaimer, the term of this patent is extended or adjusted under 35 U.S.C. 154(b) by 311 days.

(21) Appl. No.: 12/263,517

(22) Filed: Nov. 3, 2008

(65) Prior Publication Data

US 2009/0174573 A1 Jul. 9, 2009

Related U.S. Application Data

(63) Continuation-in-part of application No. 12/233,640, filed on Sep. 19, 2008.

(60) Provisional application No. 61/038,427, filed on Mar. 21, 2008, provisional application No. 61/018,897, filed on Jan. 4, 2008.

(51) Int. Cl.
*B60Q 1/00* (2006.01)

(52) U.S. Cl. ........ 340/438; 340/905; 340/907; 340/936; 701/117; 701/119

(58) Field of Classification Search .................. 340/917, 340/906, 933, 932, 905, 907, 936; 701/117, 701/119
See application file for complete search history.

(56) References Cited

U.S. PATENT DOCUMENTS

| | | | | |
|---|---|---|---|---|
| 4,214,266 | A | 7/1980 | Myers | |
| 4,580,875 | A | 4/1986 | Bechtel | |
| 4,626,850 | A | 12/1986 | Chey | |
| 4,630,109 | A | 12/1986 | Barton | |
| 4,961,625 | A | 10/1990 | Wood | |
| 5,519,390 | A | 5/1996 | Casini | |
| 5,539,398 | A * | 7/1996 | Hall et al. | 340/907 |
| 5,734,339 | A | 3/1998 | Ogle | |
| 5,817,430 | A | 10/1998 | Hsieh | |
| 5,888,074 | A | 3/1999 | Staplin | |
| 5,983,161 | A | 11/1999 | Lemelson | |
| 6,108,141 | A | 8/2000 | Gadberry | |
| RE36,930 | E | 10/2000 | Houten | |
| 6,147,623 | A | 11/2000 | Rippen | |

(Continued)

FOREIGN PATENT DOCUMENTS

| | | |
|---|---|---|
| CA | 2510969 | 12/2005 |

(Continued)

*Primary Examiner* — Daryl Pope
(74) *Attorney, Agent, or Firm* — Robert Platt Bell

(57) ABSTRACT

The present invention includes a number of embodiments for improving vehicle situational awareness at intersections. A first embodiment may comprise a lens fitted at the top of the windshield or outside the vehicle, for refracting the light to the driver, so the driver may more easily see signals, signage and other features of an intersection, as well as other traffic. A second embodiment of the invention is used as an aid to prompt the driver that a light has changed. In a third embodiment, the light change sensor may be combined with other vehicle status information. As the car comes to a stop, the route guidance system may determine if the vehicle is at or in the vicinity of an intersection. Depending on the route guidance database, the system may also know whether or not there are traffic lights at the intersection. Using the vehicle's on board forward-looking radar sensor, the system may then determine if it is first in line at the intersection. In a fourth embodiment the system may be part of a portable after-market routing device. In a fifth embodiment the system, either portable or fixed, may be used to detect changes in the intensity of the brake lights of the vehicle ahead.

14 Claims, 13 Drawing Sheets

U.S. PATENT DOCUMENTS

| | | | | |
|---|---|---|---|---|
| 6,396,417 | B2 | 5/2002 | Lee | |
| 6,442,473 | B1 | 8/2002 | Berstis | |
| 6,672,731 | B2 | 1/2004 | Schnell | |
| 6,707,391 | B1 | 3/2004 | Monroe | |
| 6,717,610 | B1 | 4/2004 | Bos | |
| 6,774,988 | B2 | 8/2004 | Stam | |
| 6,973,318 | B2 | 12/2005 | Jambhekar | |
| 6,985,073 | B1 | 1/2006 | Doan | |
| 7,130,448 | B2 | 10/2006 | Nagaoka | |
| 7,187,301 | B2 | 3/2007 | Lu | |
| 7,274,306 | B2 * | 9/2007 | Publicover | 340/907 |
| 7,382,276 | B2 | 6/2008 | Boss | |
| 7,388,182 | B2 | 6/2008 | Schofield | |
| 7,398,076 | B2 | 7/2008 | Kubota | |
| 7,663,505 | B2 * | 2/2010 | Publicover | 340/932 |
| 2003/0016143 | A1 | 1/2003 | Ghazarian | |
| 2003/0112132 | A1 | 6/2003 | Trajkovic | |
| 2004/0222904 | A1 | 11/2004 | Ciolli | |
| 2005/0187701 | A1 * | 8/2005 | Baney | 701/117 |
| 2006/0091813 | A1 | 5/2006 | Stam | |
| 2006/0181433 | A1 * | 8/2006 | Wolterman | 340/917 |
| 2007/0276581 | A1 | 11/2007 | Bae | |
| 2007/0276600 | A1 | 11/2007 | King | |
| 2008/0106436 | A1 | 5/2008 | Breed | |

FOREIGN PATENT DOCUMENTS

| | | |
|---|---|---|
| EP | 0508765 | 10/1992 |
| JP | 2001172927 | 6/2001 |
| JP | 2004301649 | 10/2004 |
| KR | 20030055898 | 7/2003 |
| WO | WO2007010582 | 1/2007 |

* cited by examiner

| Vehicle Availability by Household | | |
|---|---|---|
| | Vehicles per household | Licensed drivers per household |
| 1969 | 1.16 | 1.65 |
| 1977 | 1.59 | 1.69 |
| 1983 | 1.68 | 1.72 |
| 1990 | 1.77 | 1.75 |
| 1995 | 1.78 | 1.78 |
| 2001 | 1.90 | 1.75 |
| SOURCE : 1969, 1977, 1983, 1990, 1995 - U.S. Department of Transportation, Federal Highway Administration, Summary of Travel Trends, 1995 Nationwide Personal Transportation Survey (Washington, DC : 1999). 2001-U.S. Department of Transportation, Bureau of Transportation Statistics, Highlights of the 2001 National Household Travel Survey (Washington, DC : 2003). | | |

FIG.1 (Prior Art)

Exhibit 14. Operational Improvement Summary for All 437 Urban Areas

| Operations Treatment | Delay Reduction from Current Projects | | Possible Delay Reduction if Implemented on All Roads (Million Hours) |
|---|---|---|---|
| | Hours Saved (Million) | Dollars Saved ($ Million) | |
| Ramp Metering (25) | 38.6 | 733 | 106.2 |
| Incident Management (272) | 129.5 | 2,493 | 222.6 |
| Signal Coordination (437) | 21.0 | 451 | 55.5 |
| Access Management (437) | 68.2 | 1,376 | 180.2 |
| TOTAL | 257 | 5,053 | 565 |

Note: This analysis uses nationally consistent data and relatively simple estimation procedures. Local or more detailed evaluations should be used where available. These estimates should be considered preliminary pending more extensive review and revision of information obtained from source databases.

Note: This operational treatment benefit summary does not include high-occupancy vehicle lanes.

FIG. 2 (Prior Art)

Exhibit 1. Major Findings for 2007-
The Important Numbers for The 437 U.S. Urban Areas
(Note: Improved methodology and more urban areas than 2005 Report)

| Measures of... | 1982 | 1995 | 2004 | 2005 |
|---|---|---|---|---|
| ... Individual Traveler Congestion | | | | |
| Annual delay per peak traveler (hours) | 14 | 31 | 37 | 38 |
| Travel Time Index | 1.09 | 1.19 | 1.25 | 1.26 |
| "Wasted" fuel per peak traveler (gallons) | 9 | 21 | 25 | 26 |
| Congestion cost (constant 2005 dollars) | $280 | $570 | $680 | $710 |
| Urban areas with 40+ hours of delay per peak traveler | 1 | 11 | 28 | 28 |
| ... The Nation's Congestion Problem | | | | |
| Travel delay (billion hours) | 0.8 | 2.5 | 4.0 | 4.2 |
| "Wasted" fuel (billion gallons) | 0.5 | 1.7 | 2.7 | 2.9 |
| Congestion cost (billions of 2005 dollars) | $14.9 | $45.4 | $73.1 | $78.2 |
| ... Travel Needs Served | | | | |
| Daily travel on major roads (billion vehicle-miles) | 1.67 | 2.79 | 3.62 | 3.73 |
| Annual public transportation travel (billion person-miles) | 35.0 | 36.4 | 44.7 | 45.1 |
| ... Expansion Needed to Keep Today's Congestion Level | | | | |
| Lane-miles of freeways and major streets added every year | 19.233 | 17.254 | 15.677 | 16.203 |
| Daily public transportation riders added every year (million) | 14.5 | 14.9 | 16.0 | 16.5 |
| ...The Effect of Some Solutions | | | | |
| Travel delay saved by | | | | |
| Operational treatments (million hours) | N/A | N/A | 270 | 292 |
| Public transportation (million hours) | 255 | 396 | 543 | 541 |
| Congestion cost saved by | | | | |
| Operational treatments (billions of 2005 dollars) | N/A | N/A | $5.0 | $5.4 |
| Public transportation (billions of 2005 dollars) | $4.9 | $7.4 | $10.1 | $10.2 |

N/A - No Estimate Available    Pre-2000 data do not include effect of operational strategies.

Travel Time Index (TTI) - The ratio of travel time in the peak period to travel time at free-flow conditions. A Travel Time Index of 1.35 indicates a 20-minute free-flow trip takes 27 minutes in the peak.

Delay per Peak Traveler - The extra time spent traveling at congested speeds rather than free-flow speeds divided by the number of persons making a trip during the peak period.

Wasted Fuel - Extra fuel consumed during congested travel.

Vehicle-miles - Total of all vehicle travel (10 vehicles traveling 9 miles is 90 vehicle-miles).

Expansion Needed - Either lane-miles or daily riders to keep pace with travel growth (and maintain congestion).

FIG. 3 (Prior Art)

| Median Age of Automobiles and Trucks in Operation in the United States: 1995-2005 | | | |
|---|---|---|---|
| | Cars | Light Trucks | All Trucks |
| 1995 | 7.7 | 7.4 | 7.6 |
| 1996 | 7.9 | 7.5 | 7.7 |
| 1997 | 8.1 | 7.3 | 7.8 |
| 1998 | 8.3 | 7.1 | 7.6 |
| 1999 | 8.3 | 6.9 | 7.2 |
| 2000 | 8.3 | 6.7 | 6.9 |
| 2001 | 8.3 | 6.1 | 6.8 |
| 2002 | 8.4 | 6.6 | 6.8 |
| 2003 | 8.6 | 6.5 | 6.7 |
| 2004 | 8.9 | 6.4 | 6.6 |
| 2005 | 9.0 | 6.6 | 6.8 |

NOTE: Light Trucks are 14,000 lbs and under.

SOURCE: The R.L. Polk Co., available at http:www.polk.com/, as of February 2006.

FIG.6 (Prior Art)

METHOD AND APPARATUS TO IMPROVE VEHICLE SITUATIONAL AWARENESS AT INTERSECTIONS

CROSS-REFERENCE TO RELATED INVENTIONS

The present application claims priority from Provisional U.S. Patent Application Ser. No. 61/038,427, filed on Mar. 21, 2008 and incorporated herein by reference; The present application also claims priority from Provisional U.S. Patent Application Ser. No. 61/018,897, filed on Jan. 4, 2008 and incorporated herein by reference; The present application is also a Continuation-In-Part of U.S. patent application Ser. No. 12/233,640, filed on Sep. 19, 2008 and incorporated herein by reference.

FIELD OF THE INVENTION

The present invention relates to a method and apparatus to improve the flow of traffic on the nation's roadways, specifically at or upon approach to intersections that have traffic lights. With the proliferation of lighted intersections to control traffic and the seemingly increasing time that drivers have to wait for traffic light changes, the present invention automatically prompts a driver when a light change is detected, thereby improving driver response and reducing the cumulative wait time at intersections, thus benefiting all road users.

BACKGROUND OF THE INVENTION

Auto accidents cost each American more than $1,000 a year, 2½ times the cost of the traffic jams that frustrate the nation's drivers, according to a report issued by the American Automobile Association (AAA). According to the AAA report, accidents cost $164.2 billion each year, which based on the methodology used in the report, comes to an annual per person cost of $1,051. AAA said the study that quantified the cost of traffic accidents was conducted by Cambridge Systematics and considered costs from medical care, emergency and police services, property damage, lost productivity and quality of life. "Nearly 43,000 people die on the nation's roadways each year," said AAA President and CEO Robert L. Darbelnet in a report. "Yet, the annual tally of motor vehicle-related fatalities barely registers as a blip in most people's minds."

Vehicle traffic continues to grow at a rate that far outpaces the supply of new roads and highways. For example, a study on California roadways, Beyond Gridlock: Meeting California's Transportation Needs in the Twenty First Century Surface Transportation Policy Project, May 2000, incorporated herein by reference, provides statistics showing that demand is far outpacing supply. Over a 13-year period, the number of vehicle miles traveled increased by 45% while new road facilities increased by 5% to 26% depending on the road type. Therefore, traffic demand increased at approximately twice the rate of new facilities over that period.

Automobile transportation may also benefit from new technologies that allow for more cars to use existing roads and facilities more efficiently. For example, these technologies may include smart traffic lights, vehicle transponders and other on-board systems. Cooperative technologies receive a lot of attention for potential future vehicle applications. Pioneered in commercial aviation, use of on-board cooperative devices, such as transponders, allows for the communication of intent between users and third parties. In aviation, all aircraft are required by law to carry transponder devices in regulated airspace for applications such as surveillance and collision avoidance. With something like 10,000 commercial and 250,000 general aviation aircraft in existence today, the use of transponders is regulated, mainly because aviation is inherently global and governments have heretofore been responsible for air traffic control.

For example, a vehicle transponder for pre-emption of traffic lights, is presented in a NASA Tech Brief, dated September 2006, and incorporated herein by reference. That tech brief describes when the unit at an intersection determines that a vehicle is approaching and has priority to preempt the intersection; it transmits a signal declaring the priority and the preemption to all participating vehicles in the vicinity. If the unit at the intersection has determined that other participating vehicles are also approaching the intersection, then the unit also transmits, to the vehicle that has priority, a message that the other vehicles are approaching the same intersection. The texts of these messages, plus graphical symbols that show the directions and numbers of approaching vehicles are presented on the display panel of a computer that is part of the transponder.

While these systems have been designed, built and no doubt work effectively, the problem with full-scale implementation is institutional and not technical. The big issue with cooperative devices is that all vehicles need to be equipped to provide benefits overall. As in aviation, if one vehicle in a particular scenario is not equipped, the entire system is rendered useless and may be unsafe. Thus a need exists in the art for a system, which is not cooperative in order to maximize benefits and operate in a mixed equipage scenario.

The U.S. DOT reported on the benefits of smarter traffic light management in a 2006 report, presented at www.benefitcost.its.dot.gov/ITS/benecost.nsf/ByLink/BOTM-October2006, incorporated herein by reference. In the Tysons Corner area of Northern Virginia, approximately 40 signalized intersections were connected to a temporary operations center. In the control room, operators monitored traffic conditions and retimed signals as necessary to improve traffic conditions. The DOT analysis estimated the system saved motorists approximately 20 million dollars annually. Stops were reduced by approximately 6 percent (saving 418 thousand dollars), system delays decreased by an estimated 22 percent (18 million dollars), and fuel consumption improved by an estimated 9 percent (1.5 million dollars). Total annual emissions of CO, NOx, and VOC were decreased by an estimated 134.6 thousand kilograms.

Other new technologies proposed for vehicle traffic management include the use of so-called intelligent beacons. U.S. Pat. No. 6,714,127, entitled Emergency Warning Intelligent Beacon System for Vehicles, incorporated herein by reference, describes a beacon system located at various points of interest to transmit local information to nearby motorists. Potential uses of the system include a speed limit beacon installed on a speed limit sign to reflect current or recommended speed limit based on weather conditions, ice, rain, potential hazards, and the like. Another use is as a fog zone beacon installed in known fog zone areas where motorists are alerted of fog zone conditions ahead. Other uses of beacons include announcing freezing bridge surfaces, frozen road surface conditions, railroad crossings, and the presence of hazardous materials.

Use of radar sensors for various vehicle applications is well described in the prior art. Radar sensors are usually used to assist parking, monitor blind spots, anticipate collisions, starting and stopping operation or during driving with distance monitoring, and to regulate separation through cruise control operation. U.S. Pat. No. 7,243,013, entitled Vehicle Radar-Based Side Impact Assessment Method, incorporated herein by reference, describes the use of radar sensors using a single radar sensor mounted on each side of the vehicle to generate a range and range-rate value for detected target objects, and a controller coupled to each radar sensor. The controller calculates estimated target object speed, angle of the target object line of travel, and a shortest distance value from the sensor to the target object line of travel, and compares the shortest distance value and a change in the angle value to respective threshold values for potential collision threat assessment.

U.S. Pat. No. 7,268,732, entitled Radar Sensor For Use With Automobiles, incorporated herein by reference, describes the use of a different frequency band and modulation technique to monitor the near field region around a vehicle. This patent also states that current radar sensors are normally used for remote object detection, and that, for near field observations, high spatial resolution is important for separation as well as angle, whereas the angular information is less important for large separations. For monitoring of separation at large range, radar sensors are conventionally used having a frequency of approximately 76 Gigahertz. These frequencies have some disadvantages, however, and frequencies of approximately 24 Gigahertz are better for near-field monitoring.

On-line magazine CNET offers reviews of various new consumer electronics items, including one by Bonnie Cha, of the Garmin Nuvi series of car GPS units, published on Nov. 20, 2006, incorporated herein by reference. The reviewer notes many newer features are now being integrated with GPS devices such as Bluetooth, so it may be used hands-free to make and accept phone calls. If a number is listed for a point of interest, the Nuvi 660 model may dial out to that business with a press of a button and traditional voice-guided directions are automatically muted during incoming calls. There are also options to send text messages, synchronize cellular phone address books and call log, and dial by voice Like most of the units on the market the maps are available in 2D and 3D view with day and night colors, and the view may be changed so that either north or the direction of travel or always at the top of the screen. Plus and minus icons on the map screen allow you to zoom in and out, and there's also a trip information page that displays car speed, direction, trip time, and so forth. The Nuvi 660 has a database with all the major categories and more specific ones; one may search for restaurants by type of cuisine, for example. While, as for the mobile phone industry, features are constantly added to in-car GPS units, these features are mainly limited to the somewhat obvious addition of user applications that run on the GPS unit's processor, with a lesser degree of integration to the GPS unit's main routing and guidance functions.

New technologies envisioned for vehicles also include the use of signaling. In the weblog blog.mboffin.com/postaspx?id=2208, on June 2007, incorporated herein by reference, the participants in the forum discuss the idea of using various lights to show the driver's use of controls. For example, the question is posed that "you have brake lights to know when someone has their foot on the brake pedal, so why not acceleration lights to know when they are pushing on the accelerator pedal?" In this example, the posters go on to discuss variable headlight intensity related to the car's acceleration, based on acceleration pedal movement. However, they quickly point out all of the impracticalities of such a scheme due to variations in different car headlamp intensities, not to mention differing ambient light conditions.

In recent years, some signaling lights have been added to cars including the third Center High Mount Stop Lamp (CHMSL), and the use of indicator lights on car mirrors and side panels. According to en.wikipedia.org/wiki/Automotive_lighting, incorporated herein by reference, in 1986, the United States National Highway Traffic Safety Administration and Transport Canada mandated that all new passenger cars have a Center High Mount Stop Lamp (CHMSL) installed. Referred to as the center brake light, or the "Dole light," after the then. Secretary of Transportation, Elizabeth Dole, this light provides a deceleration warning to following drivers, whose view of the braking vehicle's regular stop lights is blocked by interceding vehicles. It also helps to distinguish brake signals from turn signals in North America, where red rear turn signals identical in appearance to brake lights are permitted. According to NHTSA Technical Report Number DOT HS 808 696: The Long-Term Effectiveness of Center High Mounted Stop Lamps in Passenger Cars and Light Trucks, by Kahane, Charles J. and Hertz, Ellen (1998), incorporated herein by reference, the CHMSL is credited with reducing collisions overall by about 5%.

Bavarian Motor Werks, of Germany, has implemented a technology known as "adaptive brake lights" where the intensity or number of brake lights illuminated is altered depending upon the type of braking. In a normal braking situation, standard brake lights meeting DOT or other requirements are activated. However, in a panic stop (as measured by pedal pressure or accelerometers) additional brakes lights are illuminated and/or existing brake lights are illuminated at a higher intensity to better catch the attention of a following driver.

Taking the use of onboard systems and the smart car concept to a logical conclusion, there is talk of cars that drive themselves. In an interview with the British Broadcasting Corporation (BBC) on Nov. 5, 2007, published on BBC.co.uk and incorporated herein by reference, Larry Burns, GM's vice-president for research and development and strategic planning, stated that self-driving cars might be on the road by the year 2015. That article also included a description of a competition held for eleven driverless cars that had to navigate around a 60 mile course without operator intervention. The cars had various sensor devices onboard including radar and Lidar (light detection and ranging), GPS navigation, and databases.

Published U.S. Patent Application 2007/0276581, entitled Alerting a Vehicle Operator to Traffic Movement, incorporated herein by reference, identifies a zone around a host vehicle and identifies a target vehicle in the zone. The speed and location of the target vehicle are monitored and an alert is generated in the host vehicle if the target vehicle is moving outside of the zone at a speed higher than a minimum speed and the host vehicle is stationary. The system is used when a vehicle that is traveling in a series of consecutive vehicles stops due to traffic lights or a traffic jam, and the operator often fails to move the vehicle forward immediately after the traffic light changes or the traffic jam is cleared. This failure to move the vehicle forward may cause further delays or traffic jams to occur. The technique relies on forward-looking radar or other sensors to detect the motion of the vehicle in front.

While Published Patent Application 2007/0276581 addresses one of the issues relating to increasing efficiency on the nation's roads, there are many more areas where traffic throughput and latency may be improved. According to U.S. DOT statistics, listed in the 2006 Transportation Statistics Annual Report, Research and Innovative Technology Administration, Bureau of Transportation Statistics, and incorporated herein by reference, the number of cars owned per U.S. household has increased by over 60% between 1969 and 2001, as illustrated in FIG. 1. This is but one of many indicators of the ever-increasing growth of vehicle traffic in the United States, and elsewhere.

According to the 2007 Urban Mobility Report, by D. Schrank and T. Lomax, of the Texas Transportation Institute, Texas A&M University System, incorporated herein by reference, traffic signal timing may be a significant source of delay. The report states that much of this delay is the result of managing the flow of intersecting traffic, but some of the delay may be reduced if the traffic arrives at the intersection when the signal is green instead of red. FIG. 2 illustrates the potential impact of traffic light coordination in the context of other possible operations treatments. The authors go to summarize at a high level, that each peak time traveler in an urban area is subjected to almost 40 hours of delay annually (see FIG. 3). The authors further conclude that non-peak travelers are subjected to approximately 30 hours of delay annually. In this context, delay is defined as the extra time spent traveling due to congestion. Travel delay calculations were performed in two steps—recurring (or usual) delay and incident delay (due to crashes, vehicle breakdowns, etc.). Recurring delay estimates were developed using a process designed to identify peak period congestion due to traffic volume and capacity. Delay caused by other events is not included in the recurring delay estimate. Generally, these events may be categorized as one of the seven sources of unreliability, including Traffic Incidents, Work Zones, Weather, Fluctuation in Demand, Special Events, Traffic Control Devices, and Inadequate Base Capacity.

There are systems described in the Prior Art that provide warnings or other situational awareness information to the driver of a vehicle. U.S. Pat. No. 7,274,287, incorporated herein by reference, describes a warning and information system for a motor vehicle, which outputs information that is below a conscious threshold of perception. At least one signal source located in the peripheral field of vision of the user is provided, and its output signals are variable by adjusting their color, intensity, frequency, timber, or loudness. The patent describes that modern warning and information systems should warn the vehicle driver of hazardous situations, which previously had to be recognized by the driver alone. For example, some complex ambient detection systems based on radar, infrared or image processing technologies have been implemented in Mercedes Benz S-class motor vehicles, where these technologies support the longitudinal and transverse guidance of the vehicle through visual or acoustic information.

These types of information systems are usually designed so that a hazard warning is provided only when the driver has not personally perceived the hazard, otherwise the warning information has no utility. German patent document DE 199 52 506 C1, incorporated herein by reference, describes a system which displays information in the form of images or symbols at least once for a brief period of time in the primary field of vision of the operator, the period of time being below a conscious threshold of perception by the user and above an unconscious threshold of perception. The purpose being to provide a warning and information system for a vehicle, which may increase traffic reliability and support the driver of the vehicle with longitudinal and transverse guidance tasks.

There are systems described in the prior art that use image processing to aid in situational awareness. U.S. Pat. No. 7,230,538, entitled Apparatus and Method for Identifying Surrounding Environment by Means of Image Processing and for Outputting the Results, incorporated herein by reference, describes an electronic apparatus identifying the surrounding environment by means of image processing and outputting the results for use by blind people. That patent describes a guide for sight-limited pedestrians or unmanned vehicles at traffic lights and crosswalks and includes the ability to detect the presence of traffic and crosswalk lighting and changes in the lights, annunciated through an audio output, such as an earphone. The processing device applies hue analysis and geometric analysis to identify traffic signals and markings. A flowchart showing the operation of this invention is provided in FIG. 4 of the present application.

Other inventions using light detection include Taiwan patent publication No. 518965, entitled Speech Guide Glasses, incorporated herein by reference, which describes glasses comprising a sensor and a speech earphone. The sensor has two functions, the first being to sense the color of a traffic light in front of the user, and the second being the detection of obstacles ahead by receiving a reflected IR beam sent out by the sensor. The invention uses an RGB filter to process the received light prior to recognizing a traffic light. However, the effectiveness of the system is not known as all visible light may be decomposed into RGB primary colors and the data flow for the recognition process may be very substantial. Furthermore, the effectiveness of this approach in various environments and lighting conditions is unknown.

Published U.S. Patent Application 2008/0013789, entitled Apparatus and System for Recognizing Environment Surrounding Vehicle, incorporated herein by reference, describes a two camera system used to detect and recognize the environment surrounding a vehicle, as illustrated in FIG. 5. The apparatus of FIG. 5 is mainly aimed at recognizing various road markings. Conventional systems use a rear-facing camera to recognize objects surrounding the vehicle. The images are road surface markings at the lower end of a screen, making it difficult to predict specific positions of road surface markings. Further, the angle of depression of the camera is large, and has a short period of time to acquire the object leading to low quality recognition and false marking recognition. Results of recognition including the object type, position, angle, and recognition time from an additional forward-looking camera are used to predict specific timing and position of field of view of the rear facing camera, at which the object appears. Recognition logic parameters of the rear facing camera and processing timing are then optimally adjusted. Further, luminance information of the image from the forward-looking camera is used to predict possible changes to be made in luminance of the field of view of the rear-facing camera. Gain and exposure time of the rear-facing camera may then be adjusted accordingly.

Rear-view cameras for vehicles have been known in the art. Such cameras have been proposed as replacements for side rear view mirrors, to reduce air drag, or as replacements for interior rear view minors (e.g., backup camera) or the like. For trucks and motor homes, such cameras and displays have been available for years, and are also offered as aftermarket add-on items. Many manufacturers are offering such backup cameras as options in European models and in some U.S. models. However, these devices merely serve as cameras and video displays, which supplant or augment traditional rear-view mirror displays. They do not provide any automated detection features.

Volvo recently introduced a system known as BUIS, or Blind Spot Information System, which now recognizes cars and motorcycles with a camera-based monitoring system that keeps a watchful eye on the 'blind' area alongside and offset rear of the car. When another vehicle (motorcycle, car or truck) enters this zone—an area of 9.5 meters by 3.0 meters—a yellow warning light comes on beside the appropriate door minor in the driver's peripheral view. The driver is thus given an indication that there is a vehicle very close alongside. This visual information gives the driver added scope for making the right decisions in such driving situations. A digital camera is installed on each door minor. This small camera captures 25 images per second, and by comparing each frame taken, the system is able to recognize that a vehicle is within the BUS zone. The system's software is programmed to identify cars as well as motorcycles, in daylight and at night. Since BUS is camera-based, it has the same limitations as the human eye does. This means the system may not function in conditions of poor visibility, for instance in fog or flying snow. If that happens, the driver receives a message that BUS is not in action. BUS is configured not to react to parked cars, road barriers, lampposts and other static objects. The system is active at all speeds above 10 km/h. It reacts to vehicles that are driven a maximum of 20 km/h slower and a maximum of 70 km/h faster than the car itself.

Bavarian Motor Werks has implemented a similar system in the 2009 7-series sedan, utilizing radar sensors to alert motorists if a vehicle is in their blind spot during lane changes. Building on the impressive list of innovations, the 2009 7 Series is the first BMW to feature Lane Change Warning combined with Lane Departure Warning. The latter is a system that first appeared on BMW 5 and 6 Series models and uses a camera to monitor road markings. Should the driver start to stray out of lane, a gentle vibration of the steering wheel provides an alert. However, courtesy of two radars located at either side of the rear bumper, Lane Change Warning adds another level of driver safety. The sensors constantly scan the blind spot either side of the vehicle, up to a distance of 60 meters, and alert the driver to the presence of another vehicle with a triangular symbol in the door minor housing.

Although there is generally a lot of talk about the introduction of new traffic management infrastructures and data linking between vehicles, it may take many years for any type of system that is cooperative and relies on high vehicle equipage scenarios. According to U.S. DOT statistics, listed in the 2006 Transportation Statistics Annual Report, Research and Innovative Technology Administration, Bureau of Transportation Statistics, shown in FIG. 6, and incorporated herein by reference, the average age of an in-use passenger car in the United States has grown to over 9 years in the past decade. This means that any equipage scenario should consider this length of ownership, i.e., maybe up to 20 years or so for many vehicles to be replaced. Hence, there is a need for solutions that are autonomous and not cooperative in order to gain benefits in the foreseeable future.

In their book, Introduction to Remotely Sensed Data, incorporated herein by reference, Harrison and Jupp describe the human sensation of color due to the sensitivities of three types of neurochemical sensors (which are present in the cones of the retina) to different wavelengths in the visible region of the electromagnetic spectrum. They describe each sensor association with one type of cone and responding to a range of wavelengths, with varying sensitivity. One type of sensor is maximally sensitive to short wavelengths with a peak response at approximately 0.44 μm. This is often referred to as the blue sensor and is insensitive to wavelengths longer than 0.52 μm. The second sensor has peak sensitivity at 0.53 μm, or green light. The third is referred to as the red sensor although peak sensitivity actually occurs at 0.57 μm, which is the wavelength of yellow light. However; of the three, the third sensor has the highest absorption of red light.

Many camera systems emulate the functions associated with the human sensation of color. Color filter arrays are used to arrange color filters on photo sensors, such as the Bayer filter mosaic, described in U.S. Pat. No. 3,971,065, incorporated herein by reference, which refers to an arrangement of color filters used in many digital cameras image sensors to create a color image. The filter pattern is 50% green, 25% blue and 25% red. The Bayer filter is common on consumer digital cameras, and alternatives include the CYGM filter (cyan, yellow, green, magenta) and RGBE filter (red, green, blue, emerald), and the Foveon X3 sensor, which layers red, green, and blue sensors vertically rather than using a mosaic; or using three separate CCDs, or one for each color. There are various other types of sensors that filter based on color such as described in Published U.S. Patent Application No. 2007/0024879, entitled "Processing Color and Panchromatic Pixels," and incorporated herein by reference, and Published U.S. Patent Application No. 2007/0145273, entitled "High-Sensitivity Infrared Color Camera," also incorporated herein by reference.

There are various systems available on the market including software and hardware for data analysis, pattern recognition and image processing, however; the task of identifying changes in status of traffic lights is relatively simple in terms of target association. As shown in FIG. 7, the progression of a light change from red (stop) 20, 25 to green (go) 30, 35 is generally vertical, with the red light geometrically directly above the green light. As is known in the art, red (stop) light 20,25 may include a strobe light and one or more of green (go) light 30,35 may incorporate a green arrow. The range of the scale (i.e., the proximity of the red to the green) is also quantifiable based on typical distances from the intersection to the position of the light. There are other identifiable patterns, such as the horizontal relationship between dual lights, as shown in FIG. 7 where the dual reds 20, 25, and the dual greens 30, 35, are shown.

Gadberry, U.S. Pat. No. 6,108,141, issued Aug. 22, 2000 and incorporated herein by reference discloses a Fresnel lens type device that may be attached to a windshield, so that a driver can more easily view a traffic signal. These types of Fresnel lenses are used in the Recreational Vehicle (RV) and bus industries and for vans and other large vehicles where view from the rear window is limited. Gadberry proposes a smaller version of these stick-on lenses (which use static cling to attach to a window) so a driver can more easily see a traffic light. He proposes, in one embodiment, giving them away free as an advertising promotion.

Schofield et al., U.S. Pat. No. 7,388,182, issued Jun. 17, 2008, and incorporated herein by reference, discloses an image sensing system for controlling an accessory or headlight of a vehicle. One embodiment appears to be a variation on the automatic headlight dimming devices known in the art since the Cadillac "twilight sentinel" of the 1950's. However, Schofield discloses being able to detect oncoming headlights and also brake lights of cars ahead. In one alternative embodiment (Col. 12, lines 22-29) he mentions being able to detect the spectrum of a traffic light, so as to determine whether a light has turned yellow or red from green.

Schofield would appear to suffer from a number of technical problems. While it is possible to detect the frequency of light from a traffic signal, other lights (advertising, automotive, and the like) may also be at the same frequency, possibly generating false signals. In addition in complex or sequential intersections, where multiple traffic lights are within the field of view of the device, it may be difficult to discriminate the correct signal for a given intersection and lane within an intersection. A green arrow, for example, may generate a signal on a green wavelength, but it does not mean that a car in the center lane may proceed.

Doan, U.S. Pat. No. 6,985,073, issued Jan. 10, 2006, and incorporated herein by reference, discloses an apparatus for monitoring traffic signals and alerting drivers. Doan discloses a mechanism for monitoring status of traffic signals. A photodiode sensor mounted on the rear view minor (FIG. 2) senses traffic stoplights and taillights of other vehicles. Doan uses a wireless system to send data to off-vehicle receivers for accident reconstruction and law enforcement capabilities.

Doan is relevant to the present discussion in that he discloses monitoring traffic signals and alerting a motorist. However, his photodiode system would seem to have the same issues as Schofield, as it would not detect a traffic signal unless the diode was aimed properly. In addition, it is not clear how the system would react to multiple signals in the same area (green arrows, adjacent or subsequent lights, complex intersections) so the incidence of false alarms could be common (with dangerous results, if a driver relies upon a false green indicator). It also appears that Doan's device might trigger on other types of lighting (signage, advertisements, neon, car lights, etc.) as a photodiode is not very discriminating. Areas with large numbers of colorful lighted signs (e.g., Times Square) might overwhelm such a simple detector. While the Doan patent discusses wireless communications, it does so only in terms of broadcasting from the vehicle to a non-vehicle, for forensic and law enforcement purposes.

Kubota, U.S. Pat. No. 7,398,076, issued Jul. 8, 2008, and incorporated herein by reference, discloses a method for producing traffic signal information. This patent uses a machine vision system to determine whether an image of a traffic signal is present in the field of view. This patent represents an improvement over Doan, as the photodiode of Doan is probably too primitive to reliably detect traffic signals. Image sensing has its own problems, of course. Again, multiple traffic lights in the field of view may confuse the system. Moreover, even the image of a traffic light (e.g., on a billboard) may be confused with an actual signal.

Bae, Published U.S. Patent Application No. 2007/0276581, published Nov. 29, 2007, and incorporated herein by reference, discloses a method for alerting a vehicle operator to traffic movement. The system uses vision cameras and other sensors to detect if a vehicle ahead of a stopped car has moved and alert the driver to accelerate accordingly. This invention appears to be narrowly focused on one particular driver scenario.

The Prior Art references cited above demonstrate a long felt need in the art for automated and semi-automated vehicle system to improve driver situational awareness system for use in intersections. As automobile use expands worldwide, traffic congestion increases, driver distractions increase, and driver skills continue to deteriorate, the number of accidents at intersections will increase over time, resulting in death, personal injuries, and increased costs for motorists for insurance and repairs. Systems are needed to improve driver situational awareness as more and more unskilled drivers take to the road and as highway congestion increases.

SUMMARY OF THE INVENTION

The present invention includes a number of embodiments for improving vehicle situational awareness at intersections. A first embodiment may comprise a lens fitted at the top of the windshield or outside the vehicle, for refracting the light to the driver, so the driver may more easily see signals, signage and other features of an intersection, as well as other traffic.

A second embodiment of the invention is used as an aid to prompt the driver that a light has changed. When used as an aid for situational awareness the system does not have to be exact, but merely good enough to recognize a change in light status and prompt the driver to look at the lights before proceeding.

In a third embodiment, the light change sensor may be combined with other vehicle status information. As the car comes to a stop, the route guidance system may determine if the vehicle is at or in the vicinity of an intersection. Depending on the route guidance database, the system may also know whether or not there are traffic lights at the intersection. Using the vehicles on board forward-looking radar sensor, the system may then determine if it is first in line at the intersection. Once the light changes and is detected by the light change sensor, the driver is prompted to confirm that the light has changed before proceeding.

In a fourth embodiment the system may be part of a portable after-market routing device. These devices are commonly mounted to the automobile dash or the lower windshield. If the device is standalone then it may not necessarily have access to radar data, although that is possible through interconnection within the vehicle such as in-vehicle communications. However, the portable device itself may have forward-looking radar on the rear of the portable unit, and it may also have a better vertical field of vision to detect light changes (the shaded area). In this embodiment, the self-contained routing unit has a built in forward looking radar, and a forward looking light change detector, as well as access to the automobile navigation information, derived dynamics, and database.

In a fifth embodiment the system, either portable or fixed, may be used to detect changes in the intensity of the brake lights of the vehicle ahead. In cases where the automobile is not the first in line at the traffic light this may serve to indicate to the driver that the driver ahead has taken pressure off the footbrake and may shortly accelerate. This light change indication may precede any indication of movement from forward-looking radar.

Each of the embodiments disclosed herein may be used to provide signals or other communications to a driver to improve situational awareness at an intersection or other area. In addition, the embodiments of the present invention may also be applied to semi-automatic driving systems to apply controls to a vehicle (brakes, accelerator, signals) automatically or semi-automatically, as conditions dictate. Thus, for example, if the system detects that a driver is about to run a red light, it may activate the brakes on the vehicle to prevent such action. The various embodiments of the present invention may also be applied to autonomous driving systems, as an aid to such systems as an input of traffic conditions.

BRIEF DESCRIPTION OF THE DRAWINGS

FIG. 1 is an extract from U.S. DOT statistics, listed in the 2006 Transportation Statistics Annual Report, Research and Innovative Technology Administration, Bureau of Transportation Statistics, showing the number of cars owned per U.S. household has increased by over 60% between 1969 and 2001.

FIG. 2 is an extract from the 2007 Urban Mobility Report, by D. Schrank and T. Lomax, of the Texas Transportation Institute, Texas A&M University System showing the potential impact of traffic light coordination in the context of other possible operations treatments.

FIG. 3 is an extract from the 2007 Urban Mobility Report, by D. Schrank and T. Lomax, of the Texas Transportation Institute, Texas A&M University System, summarizing that each peak time traveler in an urban area is subjected to almost 40 hours of delay annually.

FIG. 6 is an extract from U.S. DOT statistics, listed in the 2006 Transportation Statistics Annual Report, Research and Innovative Technology Administration, Bureau of Transportation Statistics, showing that the average age of an in-use passenger car in the United States has grown to over 9 years in the past decade.

DETAILED DESCRIPTION OF THE INVENTION

The present invention includes a number of embodiments for improving vehicle situational awareness at intersections. A first embodiment may comprise a lens fitted at the top of the windshield or outside the vehicle, for refracting the light to the driver, so the driver may more easily see signals, signage and other features of an intersection, as well as other traffic.

Figure 4:
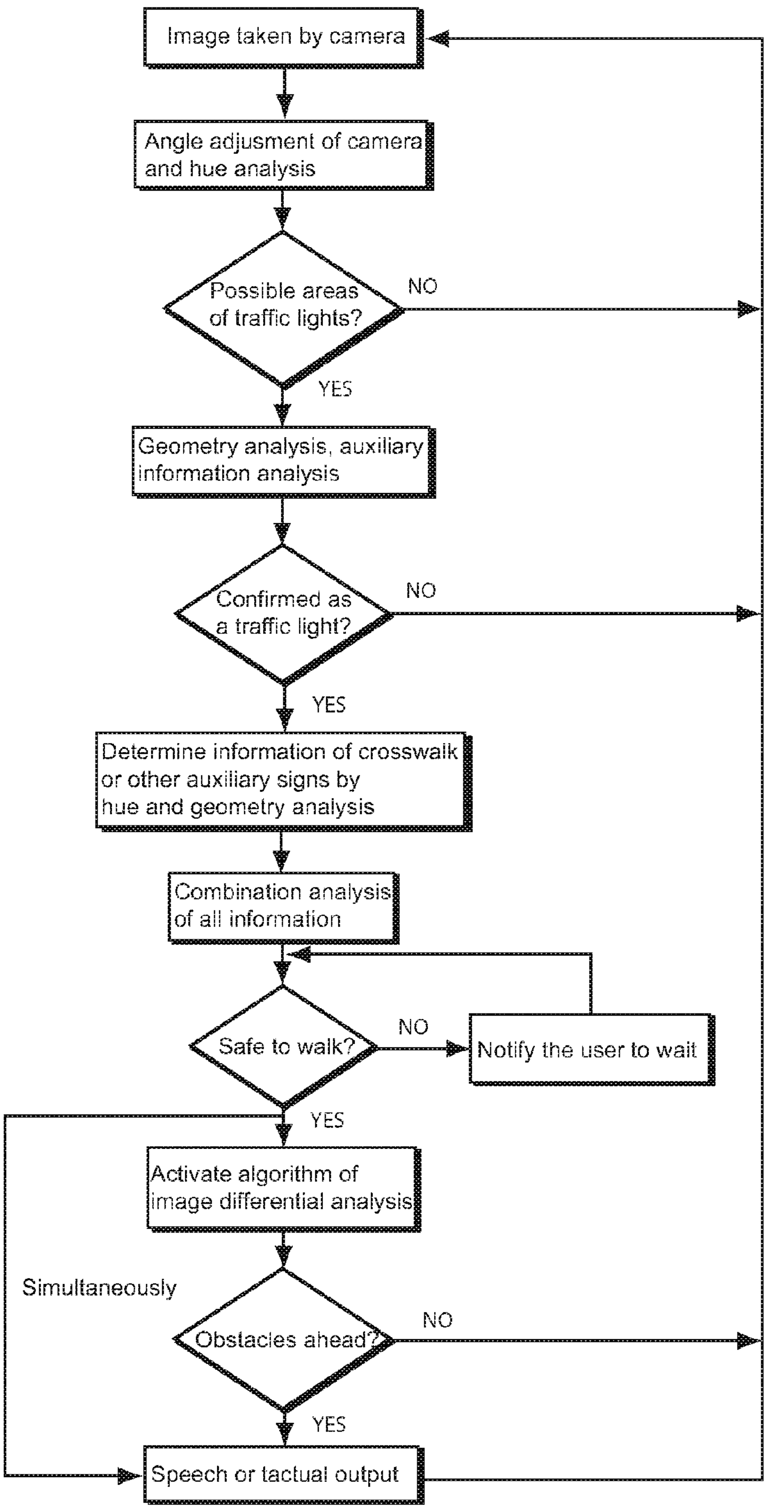
FIG. 4 (Prior Art)
FIG. 4 is a Prior Art flowchart from U.S. Pat. No. 7,230,538 entitled Apparatus and Method for Identifying Surrounding Environment by Means of Image Processing and for Outputting the Results, showing a flowchart of the image processing operations.
Figure 5:
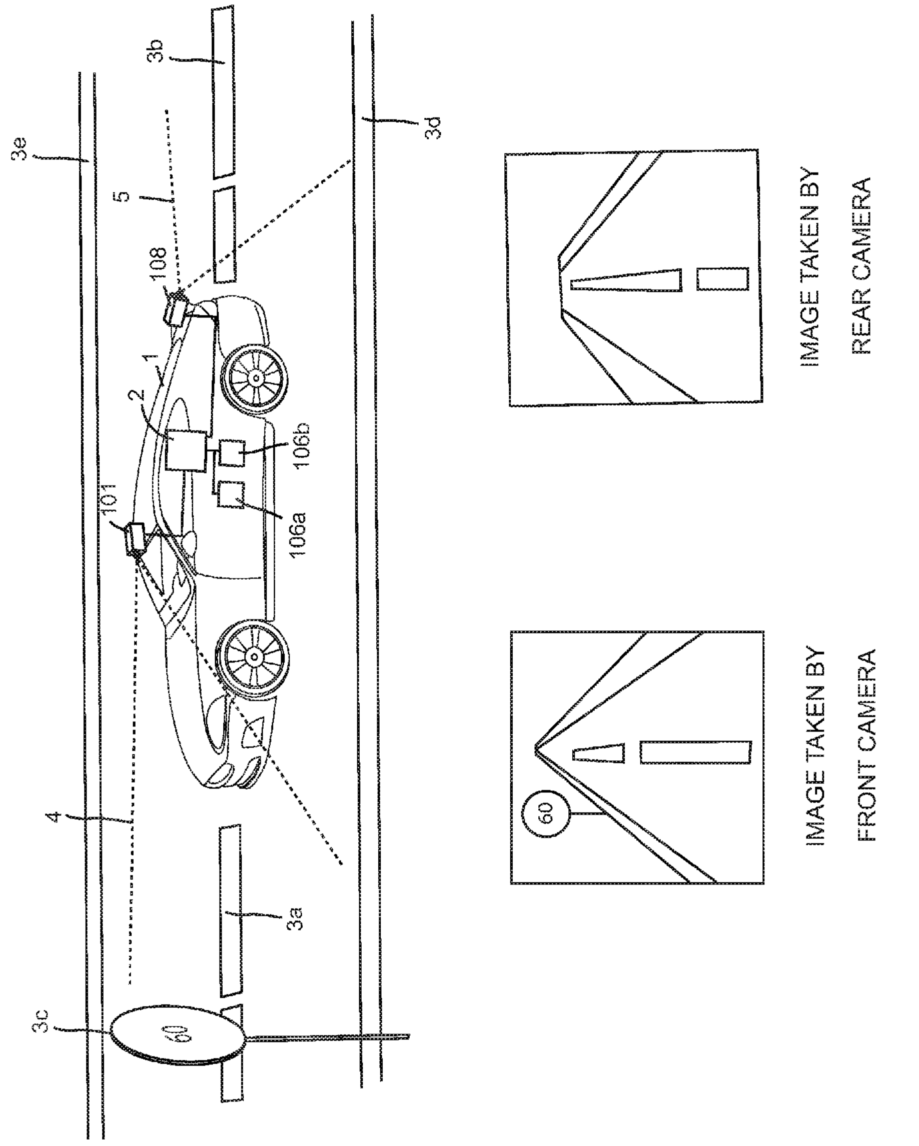
FIG. 5 (Prior Art)
FIG. 5 is an extract from Published U.S. Patent Application 2008/0013789, entitled Apparatus and System for Recognizing Environment Surrounding Vehicle, showing a two camera system used to detect and recognize road markings.
Figure 7:
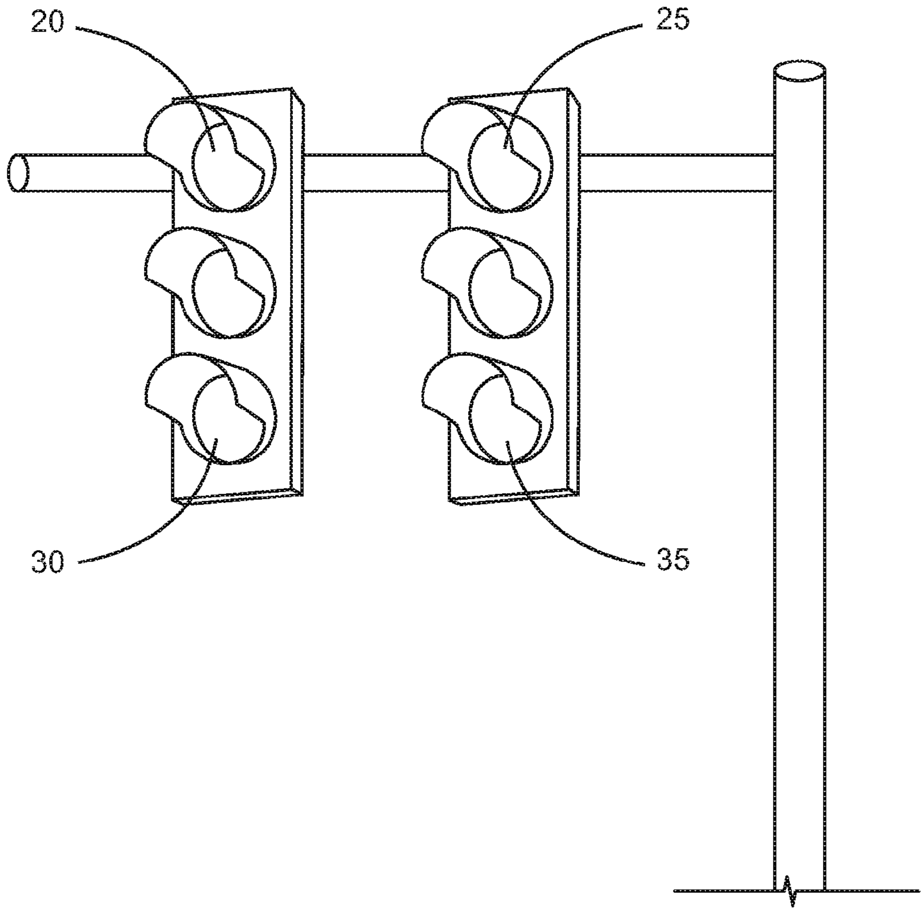
FIG. 7 is a diagram illustrating relative geometry and placement of dual traffic light signals.
Figure 8:
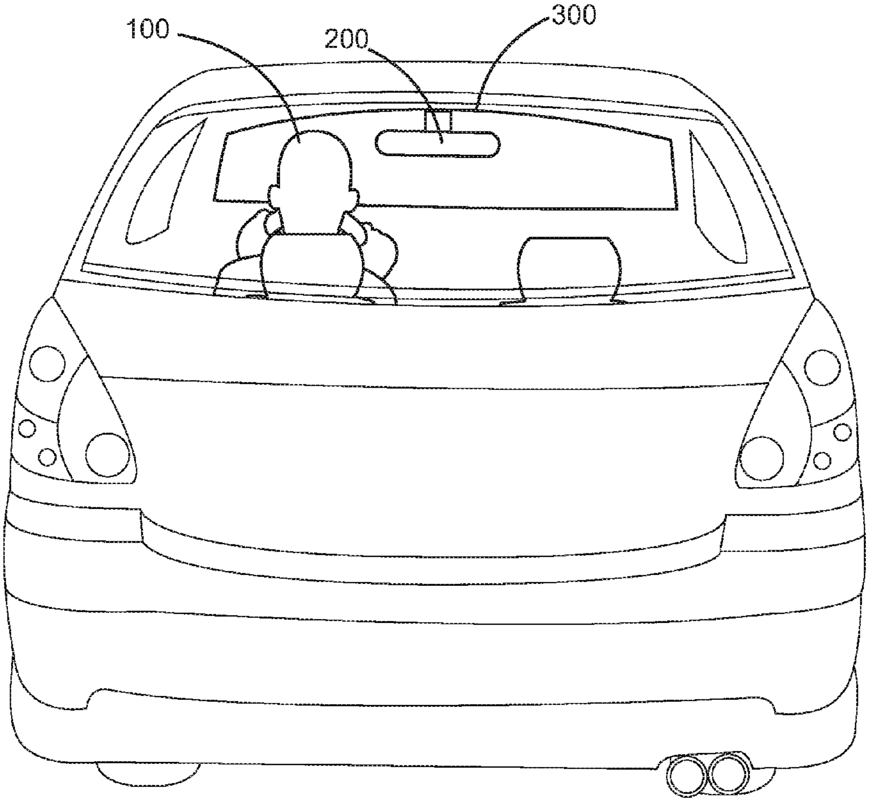
FIG. 8 is a diagram illustrating a typical driver position in an automobile, with the location of the rear view minor and the general field of vision for observing traffic lights.

FIG. 8 is a diagram illustrating a typical driver position 100 in an automobile, with the location of the rear view mirror 200 and the general field of vision for observing traffic lights 300. Note that this field of vision 300 may be partially blocked by rear view minor 200. In addition, for taller drivers, this field of vision may be obstructed by the roof of the car, such that a taller driver cannot readily see a traffic signal if the car is too close to the signal, unless the driver cranes his neck.

Figure 9:
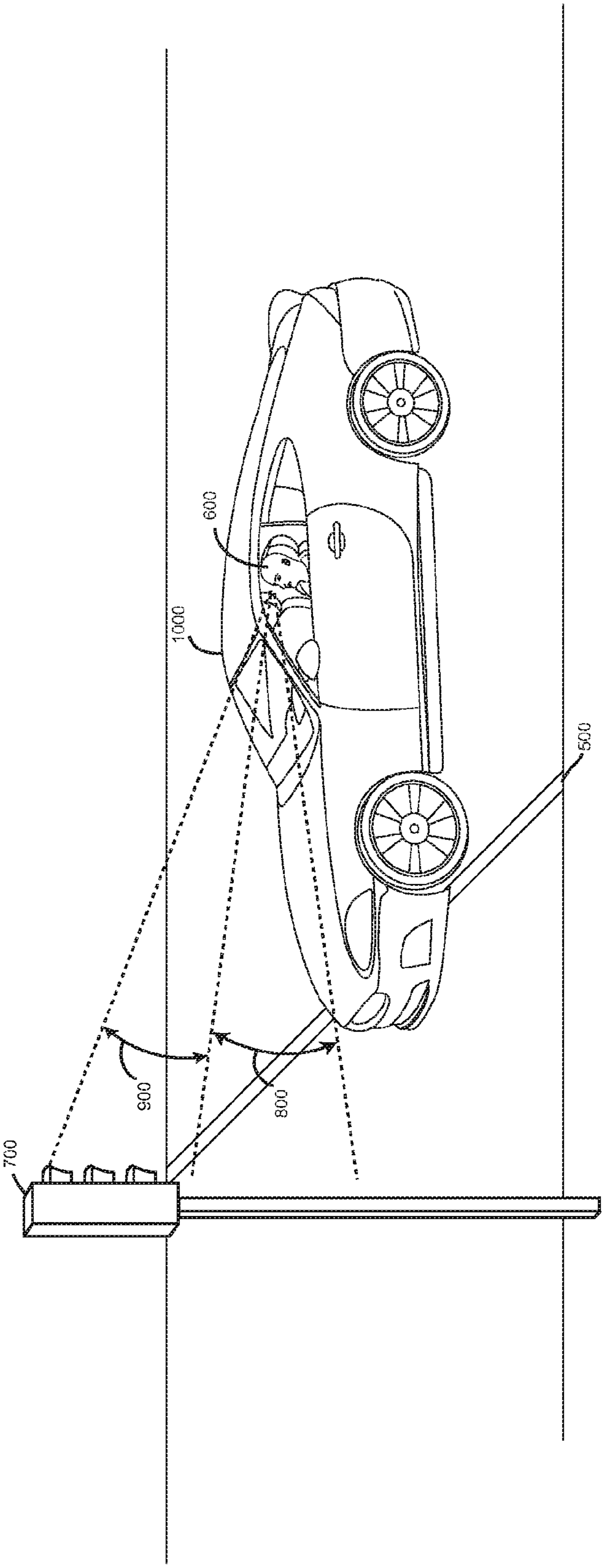
FIG. 9 is a diagram illustrating an automobile at the stop line at an intersection with a stoplight.

In the context of the vehicle's position, FIG. 9 is a diagram illustrating an automobile at the stop line 500 at an intersection with a stoplight 700. In this example, the driver 600 has a field of vision 800, which does not include the stoplight 700. In this example, the driver may have to periodically lean forward or crane his neck to view the status of the stoplight as the view is blocked by the top of the vehicle 1000. Therefore the area of interest for sensing traffic light changes is the area 300 depicted on FIG. 8, plus an extension vertically to cover the field of view 900 in FIG. 9.

In the first embodiment of the present invention, a lens or the like may be used to alter the angle of light entering at the top of the windshield, so as to allow a driver to see a stoplight, even if its direct view is obscured by the roof of vehicle 1000. This lens may be incorporated as a curved portion of the upper part of the windshield, or as a Fresnel lens or the like. In one embodiment, such a Fresnel lens may be applied to the upper part of a windshield as a stick-on aftermarket device. In another embodiment, a reflector or reflective surface may be used, for example, on the hood of the car, to allow the driver to view a traffic signal without having to lean forward or craning his neck.

The previously cited Gadberry reference discloses a Fresnel lens type device that may be attached to a windshield, so that a driver can more easily view a traffic signal. However, this first embodiment of the present invention may be applied also to the other embodiments of the present invention to enhance the field of view of an optical sensor, such as a photodiode or image sensor.

A second embodiment of the invention is used as an aid to prompt the driver that a light has changed. When used as an aid for situational awareness the system may not have to be exact, but merely good enough to recognize a change in light status and prompt the driver to look at the lights before proceeding. As illustrated in FIG. 9, in many situations, a driver who is first in line at a traffic intersection may not be able to readily see the traffic light without craning their neck or looking under the windshield header. As a result, such a driver may not be readily aware when a light changes, causing a delay in movement of traffic. If a driver accelerates too late, only a few cars may make it through the intersection before the light changes. During heavy traffic, this may rapidly cause a backup at a traffic light, resulting in driver frustration, road rage, and the like. Such situations also encourage drivers to accelerate through the intersection even after the light has changed to yellow or even red, possibly resulting in collisions with other cars.

Figure 11:
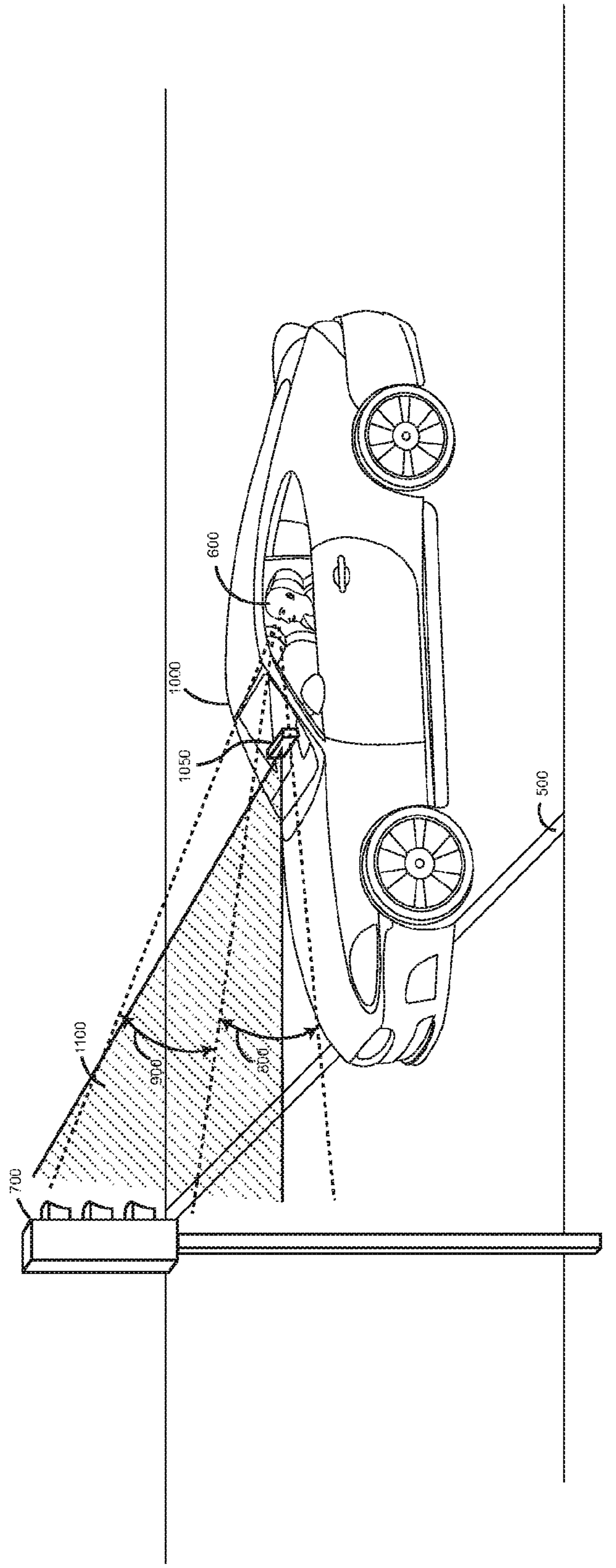
FIG. 11 illustrates a portable after-market routing device mounted to the automobile dash or the lower windshield.

In this second embodiment, illustrated in FIG. 11, a light sensor 1050 may be mounted to the vehicle, either on the rear view minor, windshield header, or the like. Such a sensor may detect traffic signal status and display such status to a driver. The sensor may comprise a photo detector or image sensor which may be aimed in the field of vision 800 including stoplight 700. Stoplight 700 may comprise a conventional traffic signal, or an enhanced traffic signal generating red, green, and yellow signals at predetermined and specific wavelengths. Sensor 1050 may then determine, based on wavelength, if a traffic signal has changed and generate an audio or visual signal to the driver.

Sensor 1040 may comprise a vision system, as known in the art, may also be employed to detect if a traffic signal has changed. Sensor 1040 may use machine vision technologies known in the art to identify a traffic-signaling device, based on a library of stored images of such devices. Once a signal has been identified, the system may determine whether the signal is closest to the vehicle (based on relative size) and determine that the signal closest to the vehicle is the signal of interest. To prevent false alarms from billboards or the like showing images of traffic signals, or from inactive traffic signals, the system may detect whether light of a predetermined wavelength is emanating from the signal at a predetermined intensity.

To avoid confusion with other traffic signals (left turn arrows, sequential intersection signals) an audio signal may announce "Attention: a traffic signal has changed" or other message to alert the driver to the change in signal, while at the same time not indicating it is safe to proceed. As previously noted, the sensor of the second embodiment of the present invention may be used in conjunction with the first embodiment to improve range, field of view, and focus for the optical sensor.

The previously cited Schofield et al., Doan, and Kubota patents all disclose sensors for detecting when a light has changed. The sensor of the second embodiment of the present invention may be employed in combination with other embodiments in order to provide a more reliable indication of traffic light status.

Figure 10:
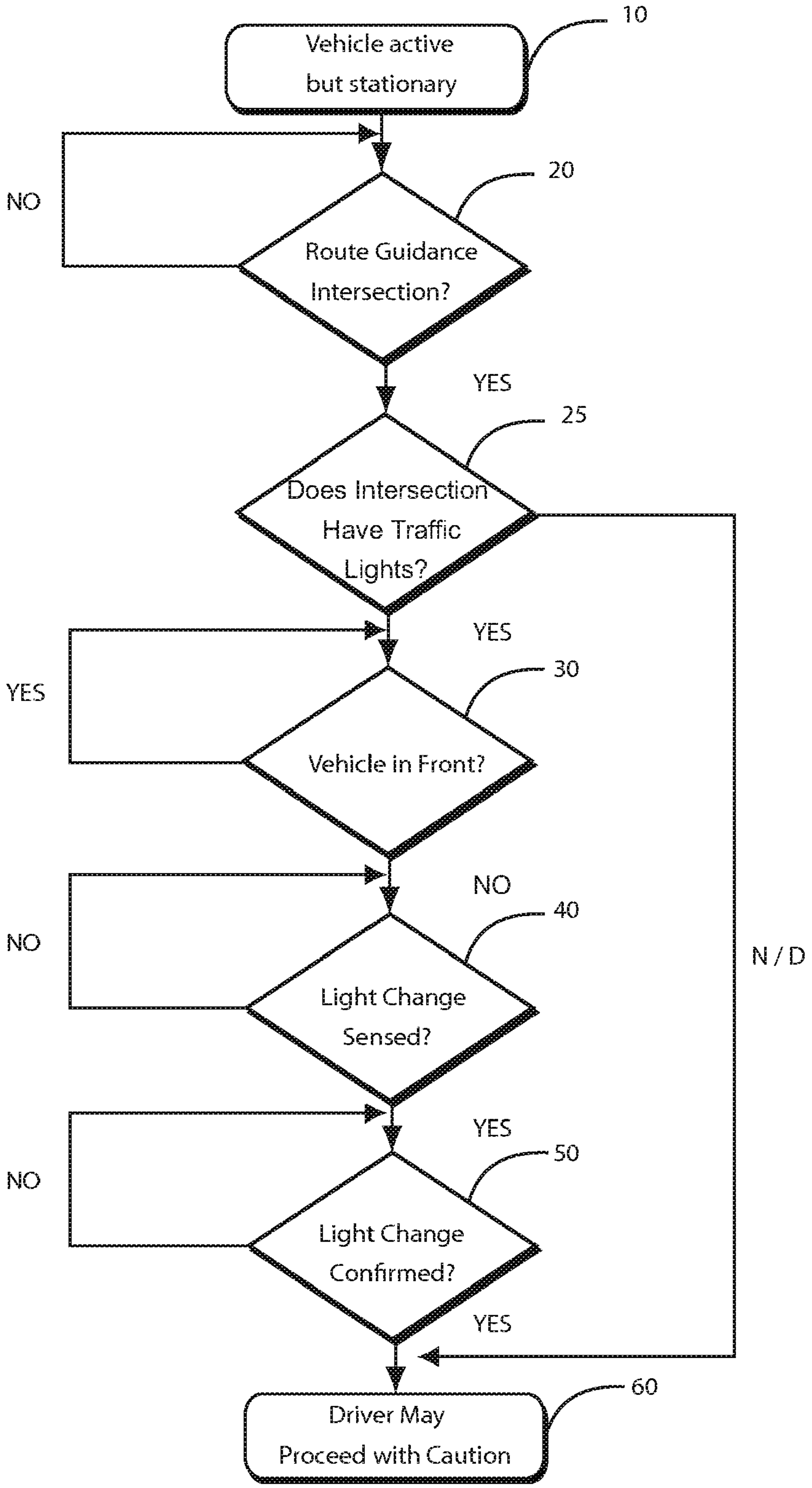
FIG. 10 is decision chart showing that the light change sensor may be combined with other vehicle status and on board systems information.

In a third embodiment of the present invention, the light change sensor may be combined with other vehicle status information as shown in the decision chart in FIG. 10. This embodiment uses additional data to confirm that the signals received are actually traffic signals intended for the vehicle, and are not traffic signals for adjacent lanes, successive intersections, or mere images of a traffic signal on a billboard.

As the car comes to a stop in step 10, the route guidance system (e.g., Global Positioning System (GPS) based guidance system or the like) may determine if the vehicle is at or in the vicinity of an intersection in step 20, using the route guidance database and GPS (or other tracking device) position data to determine the location of the vehicle. Vehicle speed and whether the vehicle has stopped can be determined from a vehicle tracking system or onboard vehicle speed sensors, or a combination of sensors. One set of sensors may be used to confirm the status of another. Thus, for example, the vehicle speed sensor can be compared with a GPS sensor and vice-versa, taking into account any latencies in the GPS system due to speed averaging, calculation time, and the like. If a discrepancy in sensor data is detected, an error message may be appropriately generated and the system shut down for safety purposes.

Depending upon the route guidance database, the system may also know whether or not there are traffic lights at the intersection in step 25. The route guidance database may contain data indicating where intersections are located on various routes, as is known in the art. Additional data, indicating whether intersections have traffic signals, as well as the arrangement and layout of such traffic signals, may also be programmed into the database, or alternately downloaded from other sources. Data may be downloaded from the Internet to the vehicle to indicate the arrangement of traffic signals at a particular intersection. This data may be used to update the GPS database, as intersection controls may be changed over time. In addition, intersection data may be broadcast using radio or infrared signals from the traffic signals or controllers, or the like. Each traffic controller system may use a low-power AM or FM signal, or broadband signal, Bluetooth, WiFi or the like, to broadcast its location and arrangement of signals, as well as signal status (red, green, yellow, and the like).

In addition, optical sensors, including light sensors and imaging systems, as disclosed in the second embodiment of the present invention, may be used to detect the presence of traffic signals. This detection may be confirmed with other data, such as intersection data from GPS databases and other sources previously listed. Confirmation of the existence and status of the traffic signal may be determined and used to reduce errors. If a conflict is detected between different sensor data, an error message may be generated indicating such error. Alternately, a weighing scheme may be used to determine whether a traffic signal is present. Since the system is aware of vehicle location and speed, sensing of traffic signals can be filtered appropriately, so that driver reminders or signals are not generated at non-intersection areas, reducing the incidence of false alarms.

In step 30, using the vehicle's onboard forward-looking radar sensor, the system may then determine if it is first in line at the intersection. Note that all of the sensors shown in FIG. 10 may not be required for the system to work. Any number of sensors may be applied as are present on a vehicle or are available. As many of these sensors are already present on a vehicle for other purposes, the present invention may be applied without excessive cost or extra hardware. Vehicle radar systems, including Micro-Impulse Radar (MIR) may be provided as part of a radar cruise control system and/or a parking sensor (proximity) system. Such systems maybe interfaced to a vehicle data bus, and thus connecting the present invention to such systems may comprise no additional wiring other than to access the vehicle data bus. Such radar systems can detect the presence of another vehicle ahead or behind the vehicle, and such data may be present on the vehicle data bus or by another connection. Alternately, dedicated sensors may be used, at an additional cost.

Once the light changes and is detected by the light change sensor in step 40, the driver is prompted to confirm that the light has changed in step 50 before proceeding in step 60. The light change detection in step 40 may be achieved using the second embodiment of the present invention, which may utilize optical sensors, as well as other types of sensors detecting traffic signal status. As Bluetooth and Internet data connections (e.g., WiFi, Satellite, wireless modem, wireless broadband) are becoming more common on vehicles, it is possible for a "smart" traffic signal to generate an electrical signal indicating the status of a traffic signal for each roadway leading into the intersection. Using such technologies, it is possible for visual traffic lights (and their attendant cost and maintenance) to be eliminated entirely, in favor of vehicle mounted lights and controls. However, implementation of such a scheme would require installation of new hardware on nearly every traffic light in the country and on every vehicle in use. The present invention, however, can make use of such signals to confirm optical sensor inputs.

As previously noted, in step 50, the driver alert may comprise a visual or audio message to the driver that a signal has changed. To avoid liability in the event of a system malfunction, the system may only announce a generic message such as "Attention: a traffic signal has changed" and perhaps a safety message "Proceed with caution if appropriate" such that the decision whether to travel through the intersection still remains with the driver of the vehicle. Once alerted to the traffic signal change, the driver may then proceed through the intersection at step 60.

In this third embodiment, a driver may be alerted to a light change, so as to prevent a driver from standing at a green light without realizing that it has changed, causing and adding to traffic congestion. Such driver distraction is becoming increasingly common, not only because of the limitations in vision as illustrated in FIG. 9, but because of increased driver distractions such as cellular telephones and other messaging devices, in-car navigation and entertainment systems, and the increasing trends in other driver distractions (e.g., consuming food and beverages in the car).

The system may also be used to prevent a driver from inadvertently running a red light or proceeding when a light is red, such as what happens to some drivers when an adjacent green arrow is illuminated. By using the imaging system of the second embodiment and/or traffic signal status data from the signal itself, the system can announce other messages, such as "Green arrow, do not proceed, wait for green light".

The system may interface with traffic control software via satellite, RF or IR signals or the like, to receive data from a traffic control system indicating the status of a light (red, green or yellow or the like). In this manner, a driver may be apprised as to a red light, even if the signal bulb has burned out or otherwise malfunctioned. The system may also be used to save fuel. Many drivers will continue at speed to a red traffic signal, as they do not look far enough ahead of their vehicle to anticipate stops. Many drivers erroneously believe driving faster toward a red light will get them to their destination faster. Accelerating toward a red light wastes fuel. Anticipating stops and decelerating in a timely manner can significantly reduce fuel costs. For hybrid and electric vehicles which use regenerative braking, such gentle deceleration if often key to obtaining maximum regenerative braking energy recovery. Sudden hard stops require the use of the service (friction) brakes, which do not recapture energy, but rather dissipate it as heat.

Thus, if a traffic signal is indicated a block ahead, the present invention may detect the status of this signal (optically or through data sources) and send a message to the driver (visually or verbally) such as "Slow down, Red Light ahead." Additional messages, such as "slow down now to save fuel" may be made to encourage driver compliance. The system may know not only the status of a light, but also when the light will change, or an estimate of when the light will change. For example, if the optical system detects that a light a block away has just turned red, then it may be assumed it will still be red when the car arrives, prompting the driver to slow down rather than accelerate toward a red light. Additionally, the system may know the exact moment when the light will change, from radio data, and then prompt the driver to maintain a speed which will allow the vehicle to travel through the intersection, arriving at a time when the light has already changed to green. An audio or visual signal may be generated, such as "maintain speed of 25 miles per hour, if possible" to encourage the driver to maintain a speed, which allows the driver to arrive at the light when it is green.

In addition, such a system may be utilized in combination with other systems such as autonomous vehicle driving systems, to provide automatic vehicle control in stop and go traffic situations. The system may be used to eliminate or reduce the need for traffic lights at all. Data may be received by the system, broadcast by other vehicles in the area, or from a central database receiving signals from other vehicles in the area. Such data may indicate where each vehicle is located, its direction of travel, speed, and possibly routing information and destination. For example, if a vehicle is approaching an intersection and there is no other vehicle near that intersection, it is wasteful and inconvenient to make that vehicle stop for an arbitrary stoplight. By detecting the presence of all vehicles near an intersection and calculating their velocities and time of intersection, the system can determine if it safe to pass through an intersection without stopping. If it is not safe, the car may be instructed to slow down (or speed up) to adjust its speed to avoid other vehicles, or to stop to let other traffic by. In this manner, traffic may largely continuously flow through an intersection without the need for traffic controls, increasing traffic flow.

Figure 12:
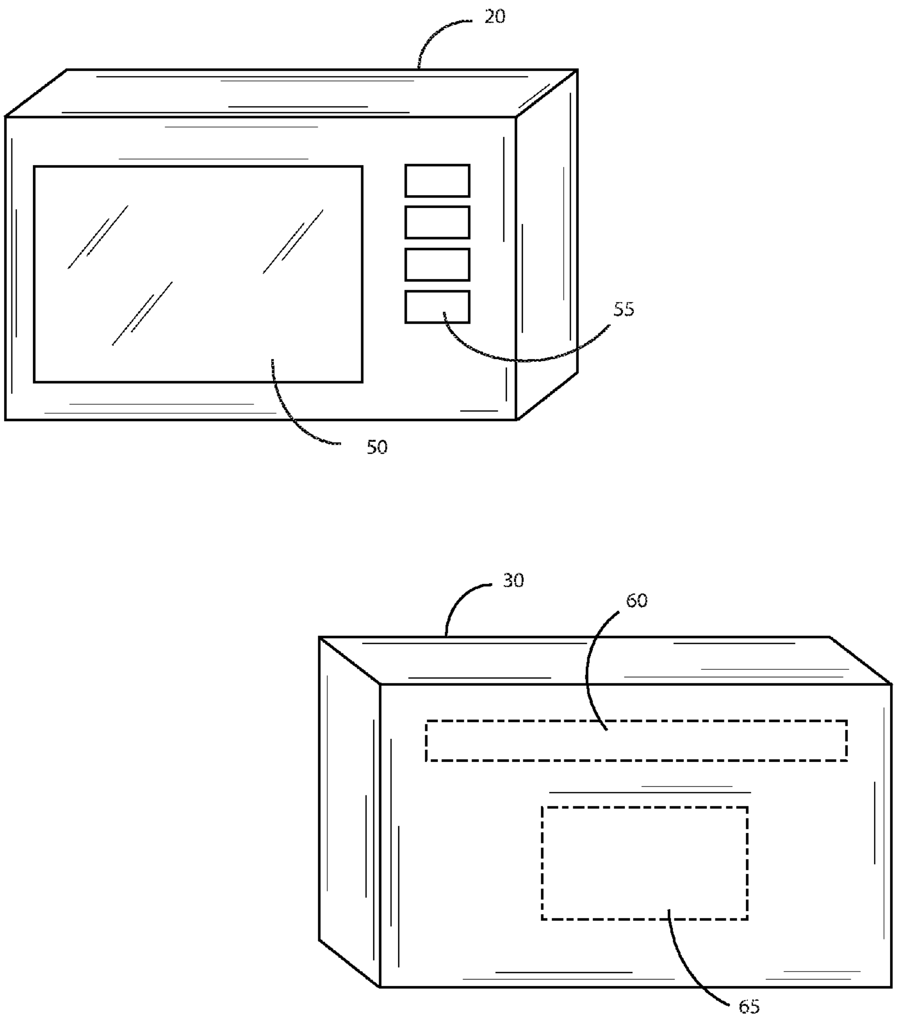
FIG. 12 illustrates a standalone navigation device, with built in light sensor and forward-looking radar.

In a fourth embodiment the system may be part of a portable after-market routing device such as a dashboard GPS or the like. These devices are commonly mounted to the automobile dash or the lower windshield 1050 as shown in FIG. 11. If the device is standalone then it may not necessarily have access to radar data, although that is possible through interconnection within the vehicle such as in-vehicle communications, either by hardwire or RF communications or the like. However, the portable device itself may have forward-looking radar on the rear face (that portion facing forward) of the portable unit, and it may also have a better vertical field of vision to detect light changes 1100 (the shaded area). In this embodiment, the self-contained routing unit has a built in forward looking radar, and a forward looking light change detector, as well as access to the automobile navigation information, derived dynamics, and database. FIG. 12 illustrates such a standalone device, with the front view 20 showing the display 50, and the function buttons 55, and rear view 30 showing the placement of the light sensor 60 and the forward looking radar 65.

In this and other embodiments of the present invention, the detection of light changing may be achieved by monitoring the position of lights, light frequency bandwidths corresponding to red, yellow and green, or by monitoring other types of signals. As previously noted, traffic control devices may be programmed or augmented to transmit low-power RF or IR signals indicating the status of a light to an in-car receiver located within a predetermined distance of the light or traffic control box. In another embodiment, the traffic lights themselves may be altered to provide an unmistakable signal, which is differentiated from ambient lighting. For example, if a traffic light is located in an urban area, commercial signage such a neon signs, large scale televisions, and the like, may compete for attention and may be mistaken as traffic signals. Traffic light signals may be modulated at different frequencies to indicate when a light is red, yellow, or green. For example, the AC power line frequency could be altered to a non-standard frequency (e.g., other than 60 Hz) and a simple notch filter used to discriminate between traffic light signals and background artificial lighting. Alternately, or in combination, the lighting may be pulsed at a high frequency, using pulse width modulation or other encoding technique, so that various traffic light signals would send a digital or other type of signal, which would be received and decoded by a car-mounted receiver. Such pulse modulation may not be readily apparent to the naked eye, or may appear as only a slight flicker.

In another embodiment, a machine vision system may be used to look for and find traffic signals based upon their unique three-light configuration (horizontally and vertically). Many traffic signals are now provided with a black "mask" surrounding the signal lights, making it relatively easy for a machine vision system to identify such signals in a field of vision.

Figure 13:
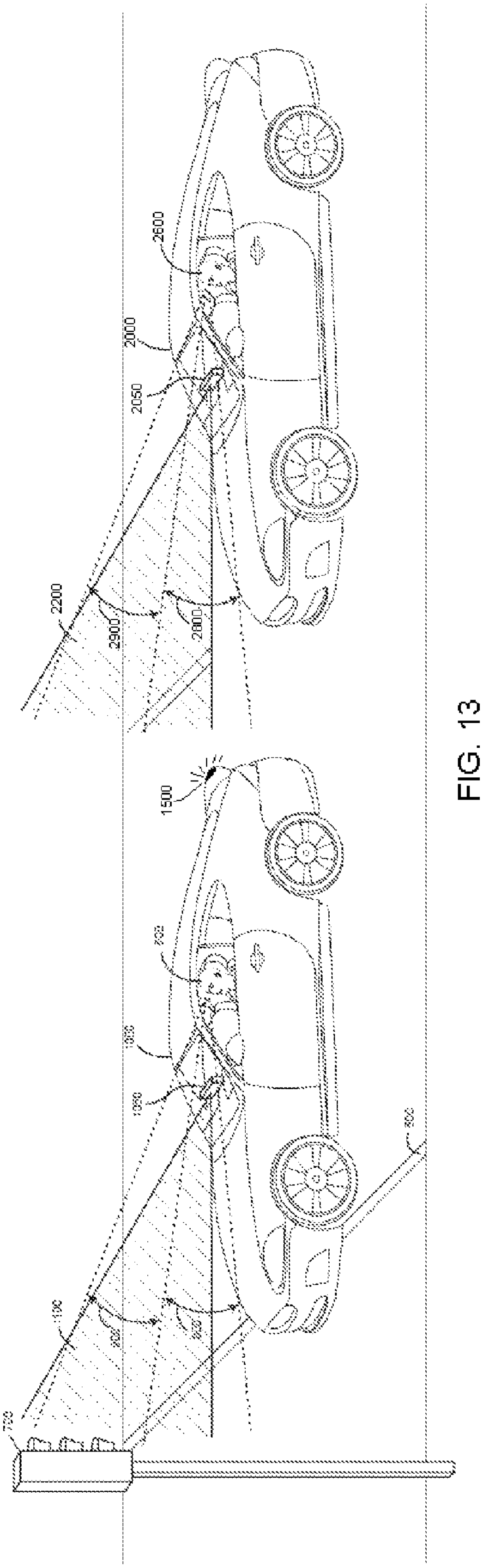
FIG. 13 illustrates the apparatus of FIG. 11 as illustrated in the fifth embodiment of the present invention.

FIG. 13 illustrates the apparatus of FIG. 11 as illustrated in the fifth embodiment of the present invention, illustrating two vehicles 1000 and 2000 at a traffic light 700. The two cars 1000 and 2000 may be as described above in connection with FIGS. 9 and 11. Driver 2600 of Vehicle 2000 may be provided with a portable device which incorporated a forward looking radar 2050, on the rear face (that portion facing forward) of the portable unit, and it may also have a vertical field of vision to detect light changes 2200 (the shaded area). In this example, the driver 2600 may has a field of vision 2800, 2900 similar to that of FIG. 9.

In this fifth embodiment the system, either portable or fixed unit 2050, may be used to detect changes in the intensity of the brake lights 1500 of the vehicle ahead 1000. In cases where the automobile 2000 is not the first in line at the traffic light 700 this may serve to indicate to the driver 2600 that the driver ahead 600 has taken pressure off the footbrake and may shortly accelerate. This light change indication may precede any indication of movement from forward-looking radar in unit 2050. Again, brake lights 1500 may be encoded with pulse data (which may not be readily visible to the naked eye) to discriminate them from other types of ambient lighting. In addition, such a system may be used to discriminate between ordinary brake lighting and enhanced brake lighting, such as used in many newer automobiles, to detect when a vehicle ahead is undergoing heavy or enhanced braking or deceleration.

While the preferred embodiment and various alternative embodiments of the invention have been disclosed and described in detail herein, it may be apparent to those skilled in the art that various changes in form and detail may be made therein without departing from the spirit and scope thereof.

I claim:

1. An apparatus for improving vehicle situational awareness at intersections, comprising:

an imaging device comprising one or more of an optical and infra red imaging device for identifying a change in a traffic signal comprising a plurality of traffic lights based upon spatial imaging of relative positioning of the plurality of traffic lights:

a vehicle route guidance system and geographical database for determining whether a vehicle is at an intersection having a traffic signal;

a forward-looking radar for determining whether a vehicle is at the front of a line of cars at an intersection; and means for alerting a driver of the vehicle of a change in the traffic signal, wherein when the forward-looking radar determines the vehicle is not at the front of a line of cars at an intersection, the imaging device identifies when a brake light of a vehicle ahead is illuminated and extinguished, and the means for alerting alerts the driver when one or more of a traffic light change is detected and the car in front has performed brake release.

2. The apparatus of claim 1, wherein the apparatus comprises a portable dashboard-mounted device.

3. The apparatus of claim 2, where the portable dashboard-mounted device is integrated with navigation, route guidance and associated geographical information, a built in forward looking radar and light change sensor.

4. The apparatus of claim 1, where the plurality of traffic lights comprises one or more of strobe stoplights and turn arrows.

5. The apparatus of claim 1, further comprising:

a data link for receiving data signals indicating traffic light status, where the traffic light status is broadcast locally to vehicles at an intersection.

6. The apparatus of claim 1, wherein the imaging device identifies a change in a traffic signal from green to red, and the means for alerting, alters a driver of an approaching vehicle that a traffic signal is about to turn red.

7. The apparatus of claim 1, wherein the imaging device identifies a light signature from the traffic signal comprising a characteristic modulation of light from the traffic signal, to discriminate light from the traffic signal from other light sources.

8. A method for improving vehicle situational awareness at intersections, comprising the steps of identifying with an imaging device comprising one or more of an optical and infra red imaging device a change in a traffic signal comprising a plurality of traffic lights based upon spatial imaging of relative positioning of the plurality of traffic lights;

determining using a vehicle route guidance system and geographical database whether a vehicle is at an intersection having a traffic signal;

determining using a forward-looking radar whether a vehicle is at the front of a line of cars at an intersection; and alerting a driver of the vehicle of a change in the traffic signal, wherein when the forward-looking radar determines the vehicle is not at the front of a line of cars at an intersection, the imaging device identifies when a brake light of a vehicle ahead is illuminated and extinguished, and the driver is alerted when one or more of a traffic light change is detected and the car in front has performed brake release.

9. The method of claim 8 wherein the imaging device is integrated into a portable dashboard-mounted device.

10. The method of claim 9, where the portable dashboard-mounted device is integrated with navigation, route guidance and associated geographical information, a built in forward looking radar and light change sensor.

11. The method of claim 8, where the plurality of traffic lights comprises one or more of strobe stoplights and turn arrows.

12. The method of claim 8, further comprising the step of:

receiving, through a data link, data signals indicating traffic light status, where the traffic light status is broadcast locally to vehicles at an intersection.

13. The method of claim 8, wherein the imaging device identifies a change in a traffic signal from green to red, and the driver is alerted of an approaching vehicle that a traffic signal is about to turn red.

14. The method of claim 8, wherein the imaging device identifies a light signature from the traffic signal comprising a characteristic modulation of light from the traffic signal, to discriminate light from the traffic signal from other light sources.

* * * * *